July 9, 1968   K. W. KAMPERT ET AL   3,391,614
HYDRAULIC ACTUATOR ASSEMBLY
Filed Aug. 21, 1967
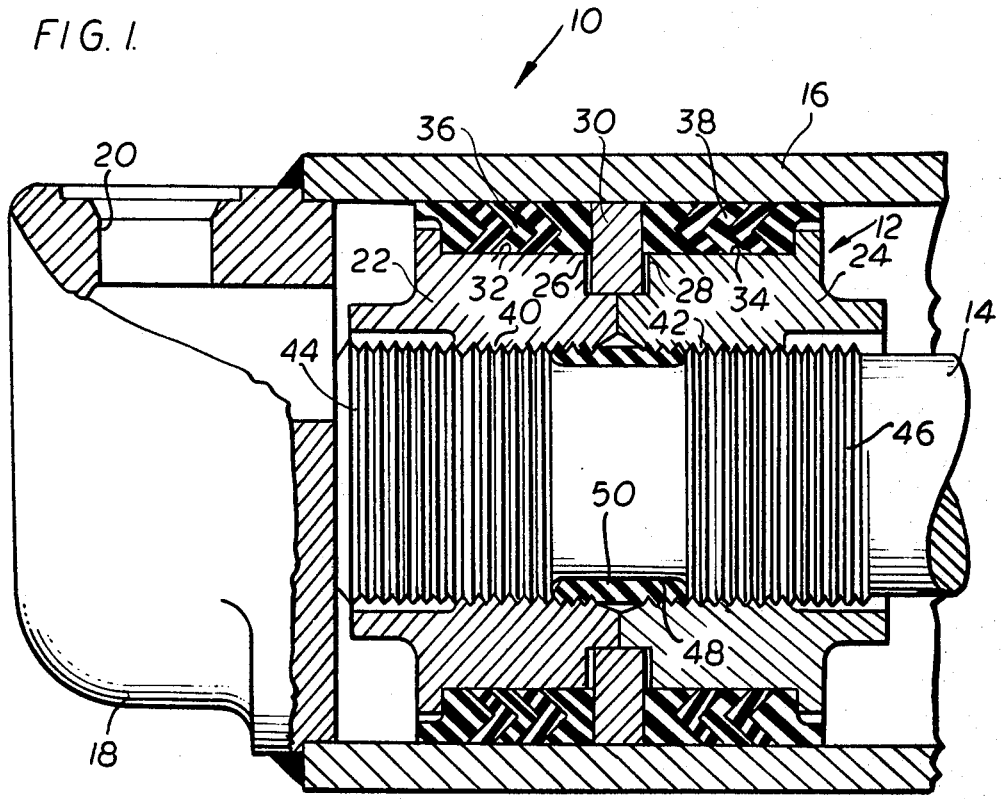
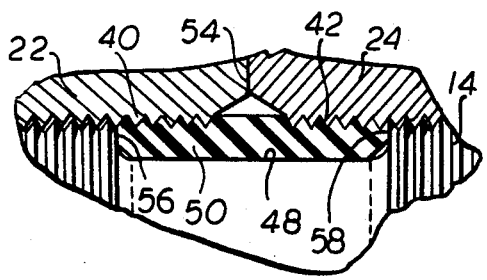
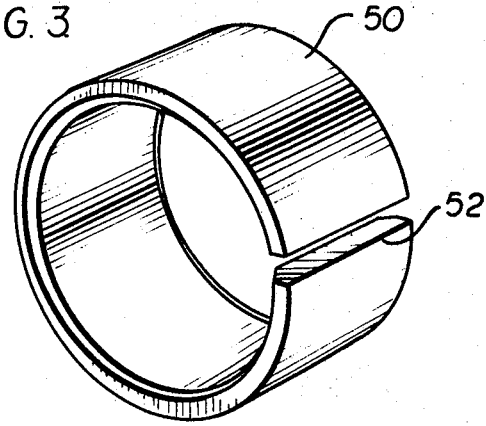
INVENTORS
KEITH W. KAMPERT
KENNETH E. HOUTZ
ATTY ent Office 3,391,614
Patented July 9, 1968

3,391,614
HYDRAULIC ACTUATOR ASSEMBLY
Keith W. Kampert, Libertyville, and Kenneth E. Houtz, Streamwood, Ill., assignors to International Harvester Company, Chicago, Ill., a corporation of Delaware
Filed Aug. 21, 1967, Ser. No. 661,875
6 Claims. (Cl. 92—244)

ABSTRACT OF THE DISCLOSURE

A piston assembly for an extensible hydraulic actuator having a reciprocating piston rod mounted in a cylinder. A deformable ring is mounted in a groove formed on a threaded end of the rod with two half pistons mounted on the rod end so as to threadably engage the deformable ring to provide a fluid seal therewith, assist in locking the pistons on the rod, and facilitate rapid assembly and disassembly of the half pistons.

Background of the invention

It is desirable to provide a piston assembly for an extensible hydraulic actuator which is easily disassembled and reassembled for repairs, such as replacement of the bearing rings or packing sets. It is also desirable if the repairs can be accomplished without removing the rod from the cylinder so that the work can be accomplished in the field. Among the various types of conventional hydraulic actuators are those in which a piston is threadably received on the rod end and held in place by means of a locknut. This construction is objectionable because of fluid leakage through the threaded connection of the piston with the rod, and also because the nut may occasionally work loose. Another type provides a piston welded to the rod, but this usually requires removal of the piston and rod from the cylinder for repairs.

Still another example of a prior art construction is that in which two piston halves are slid onto the rod end with split retainer rings being provided to lock the piston halves onto the rod. Again a sealing problem is presented by this type of construction and the assembly of the piston head onto the rod is complicated by the requirement for the additional locking members.

Summary of the invention

This invention provides a piston assembly for an extensible hydraulic actuator in which a deformable ring is mounted on a groove formed on the threaded end of the piston rod with a pair of half pistons threadably mounted on the rod end over the deformable ring. Applicants' novel invention provides a minimum number of parts to facilitate easy assembly and disassembly and reduce maintenance time for repairs to the actuator. The actuator parts of the improved invention are also relatively simple in construction and inexpensive in cost.

The deformable ring functions to lock the half pistons onto the piston rod while at the same time serving to provide a fluid seal between the rod and half pistons to prevent fluid leakage therebetween.

Applicants' novel invention is easier to assemble and disassemble as compared to conventional actuators which require either a piston head welded to the piston rod, or a piston head bolted to the rod.

Description of the drawings

FIGURE 1 is a side elevation view, partially in cross-section, of an hydraulic actuator having a piston assembly incorporating features of the present invention;

FIGURE 2 is an enlarged view of a portion of the piston assembly of FIGURE 1 illustrating details of the invention; and FIGURE 3 is a perspective view of an element of the invention as used in the piston assembly of FIGURES 1 and 2.

Description of the preferred embodiment

Referring now to the drawings and particularly FIGURE 1 the head end segment of a preferred hydraulic actuator constructed according to the present invention is illustrated generally at 10. Actuator 10 comprises piston assembly 12 mounted on the end of piston rod 14 for reciprocating movement within cylinder 16. The other end of rod 14 may be connected to any desired linkage or implement while end casting 18 secured to the closed end of cylinder 16 is mounted by suitable means on the desired frame, such as a loader vehicle. Fluid passageway 20 is formed in end casting 18 and directs pressurized fluid to actuate cylinder 16 under influence of a conventional control system, not shown.

Piston assembly 12 comprises a pair of identical annular half pistons 22 and 24 mounted on the end of rod 14 in abutting relationship. The pistons are grooved at 26 and 28 to receive annular bushing 30. Bushing 30 is fabricated of a suitable material such as bronze to function as a durable bearing surface betweent he piston assembly and inner surface of cylinder 16.

The half pistons are also grooved at 32 and 34 for mounting a pair of conventional V-shaped packing sets 36 and 38 which function to fluidly seal the space between piston assembly 12 and the inner surface of cylinder 16. The internal bores of the half pistons are tapped to form threaded segments 40 and 42, respectively.

Piston rod 14 is formed with threads 44 and 46 for interfitting engagement with the corresponding tapped threads 40 and 42 of the half pistons. A groove 48 is formed on rod 14 intermediate threaded segments 44 and 46. A deformable sealing lock ring 50 is mounted in groove 48 and is dimensioned so as to radially extend into an interference fit with threaded segments 40 and 42 of the half pistons. As illustrated in FIGURE 3 sealing ring 50 is preferably formed with at least one axially extending slot 52 to facilitate easy assembly and disassembly onto groove 48. The sealing ring is formed of a resilient material, preferably an elastomer such as nylon.

The steps for rapid assembly of piston assembly 12 onto rod 14 when positioned within the cylinder will now be explained. Piston 24 is first completely screwed onto threaded segment 46 of the rod so that the entire width of groove 48 is exposed. Sealing lock ring 50 is spread open, slipped over threaded segment 44, and snapped into groove 48. Packing set 38 and bushing 30 are next mounted on piston 24 in contact with the cylinder. Packing 36 is then mounted on half piston 22 which is screwed onto rod 14 until contact is made with sealing lock ring 50. The other half piston 24 is then screwed back until it makes contact with ring 50. The two half pistons are then turned in opposite directions simultaneously so that threaded portions 40 and 42 are forced into an interference fit with the outer surface of ring 50.

The deformable material of the ring will extrude completely to the root of the threads, as shown in FIGURE 2. The resiliency of the ring material will exert sufficient force against the half pistons so that a prevailing-torque thread lock is created to assist in holding the pistons onto rod 14. At the same time, a fluid-tight seal is provided as ring 50 axially expands to fill groove 48 and press against the interfaces 56 and 58 wth threaded segments 44 and 46. This prevents flud leakage at the threaded connections between the rod and half pistons.

After the two half pistons have made contact at their interface 54, additional torque may be applied to the half pistons so that a jam nut type of lock is produced.

With the hydraulic actuator of the present invention assembled as described above the deformable ring 50 will securely lock the half pistons to the rod while at the same time affording a fluid seal therebetween. Repair of the piston assembly is easily accomplished in the field by unscrewing the half pistons, replacing the worn-out elements, such as the packing sets 36 and 38 and/or sealing lock ring 50, and then screwing the half pistons in place as described above.

Applicants' invention obviates the need for separate locknuts or snap rings to hold the elements in place. Moreover, a shorter time is required to replace the elements as compared to conventional designs.

What is claimed is:

1. For use in an extensible hydraulic actuator having a cylinder and a piston rod mounted for reciprocating movement within the cylinder, the rod having a threaded end within the cylinder, the combination comprising: a peripherial groove on the piston rod axially positioned to divide the end into first and second threaded segments; a deformable sealing lock ring mounted in the groove; first and second annular internally threaded half pistons, each piston being threadably mounted on a respective first and second segment of the rod, each half piston overlying an adjacent surface of the ring in threadable engagement therewith to provide a fluid-tight locking seal between the pistons and rod.

2. The invention as defined in claim 1 wherein the sealing lock ring is formed with at least one axially extending slot to facilitate assembly of the ring into the groove.

3. The invention as defined in claim 1 wherein the ring is formed of a resilient material.

4. The invention as defined in claim 3 wherein the material comprises an elastomer.

5. The invention as defined in claim 1 wherein the outer surface of the ring is in interference fit with the internally threaded portions of the half pistons.

6. The invention as defined in claim 5 wherein the sides of the lock ring are in sealing engagement with the sides of the groove.

References Cited

UNITED STATES PATENTS

| | | | |
|---|---|---|---|
| 1,358,628 | 11/1920 | Fisher | 92—250 X |
| 2,686,092 | 8/1954 | Neeson | 92—252 X |
| 2,757,993 | 8/1956 | Flick | 92—244 X |
| 3,055,719 | 9/1962 | Kampert | 92—252 |
| 3,068,054 | 12/1962 | Schmidt et al. | 92—243 |
| 3,158,072 | 11/1964 | Detrez | 92—249 X |

MARTIN P. SCHWADRON, *Primary Examiner.*

G. N. BAUM, *Assistant Examiner.*